Nov. 8, 1932.  W. C. JOHNSON  1,886,615
MANUFACTURE OF COMPOSITE METAL SHEETS
Filed April 1, 1932
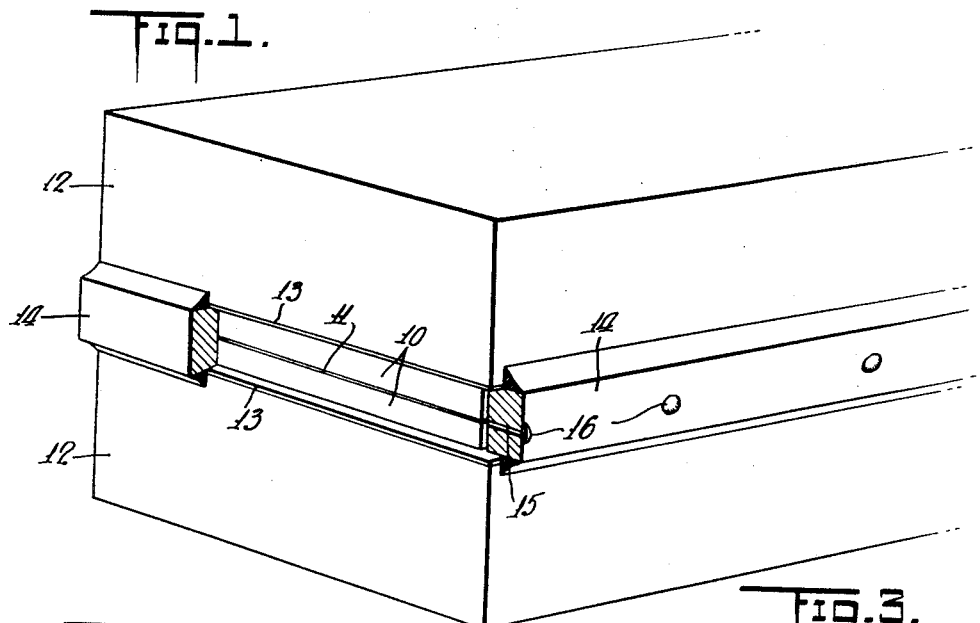
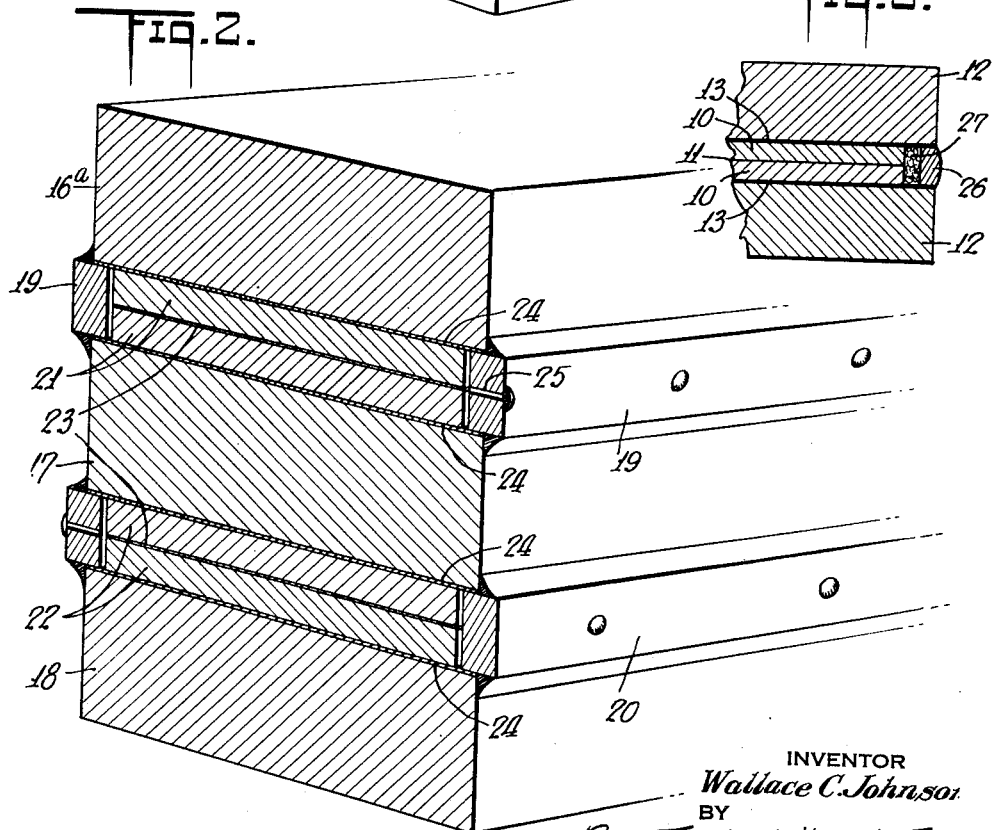
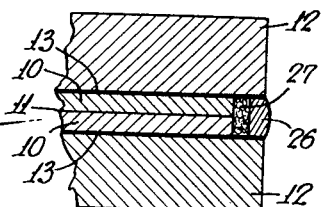
INVENTOR
Wallace C. Johnson
BY
ATTORNEYS Patented Nov. 8, 1932

1,886,615

UNITED STATES PATENT OFFICE

WALLACE C. JOHNSON, OF MORRISTOWN, NEW JERSEY, ASSIGNOR TO THE PLYKROME CORPORATION, OF NEW YORK, N. Y., A CORPORATION OF DELAWARE

MANUFACTURE OF COMPOSITE METAL SHEETS

Application filed April 1, 1932. Serial No. 602,422.

It has been proposed to employ certain corrosion resistant alloys, such as chrome steel, chrome iron, chrome nickel steel, chrome nickel, molybdenum steel and the like, as a facing layer for a base sheet of iron or steel to protect the latter against the action of acids, alkalies and such other corrosive agencies or chemicals. By employing such facings, a composite sheet or plate is formed, having an alloy surface which furnishes the required corrosion resistant characteristic, and a base sheet of steel or iron which furnishes the required strength and thickness for said plate.

Such a composite sheet or plate may be made by securing together the edges of a corrosion resistant plate, a base slab of iron or mild steel, and an intermediate bond sheet in superposed relationship, and rolling down to the desired thicknesses. The edges must be so secured as to prevent separation of the sheets during heating and the first pass in rolling, and to prevent the admission of air or furnace gases to the opposed surfaces which are to be welded together during rolling. Due to the difference in coefficient of expansion between ordinary iron or steel, and the alloy forming the facing therefor, the layers if directly welded together at the edges before heating, will expand to a different extent during heating up to welding temperature at which the rolling takes place, thereby causing the composite plate to tend to curl or warp, or the marginal weld to break loose and destroy the seal.

It has been proposed to reduce the manufacturing cost of forming these composite sheets and to protect the corrosion resistant layers during the rolling, by forming two or more composite sheets during a single heating and rolling operation. Two steel or iron slabs may be placed upon opposite sides of two corrosion resistant plates which are separated by a layer of material to prevent them from adhering during rolling. Such attempts have not been successful so far as I am advised, due to the breaking of the marginal seal during heating and the resultant admission of oxidizing air or furnace gases to the surfaces to be welded together during rolling.

The main object of the present invention is to so connect and seal the marginal edges that the free expansion and relative sliding movement of the individual sheets of said plate is permitted during heating without permitting admission of air or gases, and without permitting separation.

In carrying out my invention, two of the slabs of mild steel are placed on opposite sides of two corrosion resistant plates separated by a layer of non-oxidizing and non-carbonizing lubricant to prevent these latter plates from adhering during heating and rolling. The corrosion resistant plates are smaller than the slabs, so that the edges of the plates are spaced inwardly from the edges of the slabs. Each slab is separated from the adjacent corrosion resistant plate by a suitable thin bond sheet which aids in the operation of welding the plate to the slab.

The two slabs are welded together preliminary to the heating and rolling operation to prevent relative displacement of the layers, and to prevent admission of gases. For that purpose, bars are interposed between the slabs along the edges thereof and welded to the slabs, to entirely enclose the corrosion resistant plates. As an important feature, the bars are spaced from the edges of the corrosion resistant plates to permit these plates to expand with respect to the slabs when subjected to heating action, and to prevent breaking of the seal formed by welding the bars to the slabs. The bars are provided with holes to permit the escape of air forced out from the space behind the bars by the expansion of the inner plates, but these holes are of such size that they prevent the ingress of furnace gases into contact between surfaces to be bonded together.

After the assembled stack has been heated to the desired temperature, it is rolled down to the desired thickness, and the edges are then sheared off to permit separation of the two resulting iron or steel sheets, with their surface layers of corrosion resistant alloy.

In the accompanying drawing, there are shown for the purpose of illustration, two forms in which the present invention may be carried out. In the drawing Figs. 1 and 2 are perspective views, partly in section, of two forms in which the present invention may be carried out, and Fig. 3 is a fragmentary section showing another form in which the present invention may be carried out.

In carrying out my invention in accordance with Fig. 1, a pair of corrosion resistant plates 10 are superposed with a suitable material 11 applied therebetween to prevent these plates from adhering. I employ a lubricant which may include aluminum powder and fire clay mixed approximately in a ratio of one to two by weight to form a thin paste. This aluminum powder has a high melting point, and does not abrade the surfaces to which it is applied. Furthermore, this aluminum powder is high oxidizable and therefore, by uniting with such oxygen as may be present, decreases the liability of oxidation of the metal layers being heated and rolled.

On the outside of the two corrosion resistant plates, I mount a pair of slabs 12 preferably of mild steel. These slabs are separated from their adjoining corrosion resistant plates 10 by a thin intermediate bond sheet 13 preferably of comparatively pure iron, which will aid in the operation of welding the corrosion resistant plates to the mild steel slabs. I have also found that with certain corrosion resistant alloys, other bond or flux sheets such as ferrous copper alloy, pure copper, or pure nickel steel may be used.

The corrosion resistant plates have a greater coefficient of expansion than the mild steel slabs. To provide for relative expansion between the sheets during heating operation, the corrosion resistant alloy plates are cut smaller than the mild steel slabs, so that the edges of these alloy plates are spaced inwardly from the edges of the mild steel slabs.

The slabs 12 are then secured together by bars 14, preferably of steel, placed between the edges of the slabs and welded to the slabs but not to the inner plates. They serve to hold all of the layers together during heating and initial rolling operation, and to seal the edges of the slabs so as to prevent admission of any air therebetween. The flux sheets 13 which are disposed between the alloy plates 10 and the slabs 12 may extend outwardly from the edges of the alloy plates, so that they come in contact with the bars 14, and are utilized in aiding the welding of the bars to the slabs 12.

The bars 14 may be welded on the outside of the slabs 12, but it is more advantageous that these bars be inserted between the slabs. In this manner, the steel bars will not be subjected to any shearing action during rolling operation, tending to destroy the weld between said bars and the base slabs 12. These bars when welded in position are spaced to such a distance from the edges of the alloy plates 10 as to permit free linear expansion of these alloy plates. I have found that a space between the edges of the alloy plates and the bars, of one-sixteenth of an inch per linear foot of the alloy plates, is sufficient for this purpose. For instance, an assembly consisting of plates approximately two feet wide and seven feet long, would necessitate a space of about one-sixteenth of an inch between the sides of the alloy plates and the side bars, and a space of about seven-thirty-seconds of an inch between the ends of the alloy plates and the end bars.

The air which is between the edges of the alloy plates and the bars, when heated from room temperature to a rolling temperature of 2200°, will expand about two hundred times. To permit escape of this air, I provide the bars 14 with several small holes 15. I have found that holes of about one-quarter of an inch will be effective for the purpose of the invention. These holes 15 are preferably covered with a mass of wet fire clay 16 before the assembly is placed in the furnace. This clay, in the furnace, drys and becomes porous, or shrinks sufficiently to form openings or fissures through which the air may escape. As the flow of the air is outwardly, the furnace gas will not pass inwardly through the dry clay.

After the assembly has been made as described, it is placed in a furnace and heated to a temperature of approximately 2200° F. It is then subjected to a rolling action to weld the alloy plates 10 and the slabs 12, and the rolling is continued until the desired reduction in thickness is secured. The composite plates will cool during rolling operation, so that at the end of this operation, the temperature of the sheets may be in the neighborhood of 900° F. The initial rolling temperature may be as low as 1800° F. if the pressure is sufficient.

After the assembly has been heated and rolled as described, the composite sheets may be separated merely by shearing off the edges to remove the parts formed from the bars 14. In as much as the two stainless steel layers 10 have been separated during this heating and rolling operation by the lubricant 11, the composite sheets can then be readily separated.

In Fig. 2 is shown an assembly from which three composite sheets are to be formed during heating and rolling operations, two of said sheets consisting of a single facing of alloy on a base sheet of steel, and another sheet comprising a base sheet with alloy facings on both sides thereof. For forming these composite sheets, there are provided three slabs 16a, 17 and 18 of mild steel, held together by bars 19 and 20 welded along the edges, adjacent slabs being separated by two pairs of alloy plates 21 and 22. The alloy plates of each pair are separated by a layer of lubricant 23 as already described, and the adjoining faces between the slabs and the alloy plates are separated by flux sheets 24 for insuring a proper and effective bond. The alloy plates are spaced from the bars 19 and 20 in a manner already described, to permit the linear expansion of these plates during heating, and the bars are provided with apertures 25 as already described, to permit escape of air between the slabs. By means of this arrangement, there will be rolled a composite sheet comprising the base sheet having an alloy facing on both sides thereof, and two composite sheets, each having a single facing of alloy.

In Fig. 3 is shown an assembly particularly adapted for use in cases where the corrosion resistant plates are thin enough to permit the edges of the two outside base plates or slabs to be welded together in the ordinary manner without the use of bars such as are applied in the forms shown in Figs. 1 and 2. In this form, the pair of corrosion resistant plates 10 are sandwiched between the pair of slabs 12 in a manner similar to the form shown in Fig. 1, with the edges of the plates spaced inwardly from the edges of the slabs. The slabs are then secured together by welding the edges thereof to form a weld 26 spaced from the edges of the plates 10.

In order to provide a space between the weld and the edges of the plates 10 so that said plates may expand, there is disposed adjacent the edges of the corrosion resistant plates a layer of asbestos 27. This layer 27 prevents molten metal from coming in contact with the edges of the corrosion resistant plates 10 during the process of forming the weld 26. The thickness of the asbestos layer 27 with respect to the space between the weld 26 and the edges of these corrosion resistant plates, and the looseness of the fiber, and the compressibility, are such as to permit the compression of said layer to the extent determined by the expansion of the plates 10 during heating and initial rolling processes. The wider or longer the plates, the thicker or looser should be this compressible layer.

The spacing between the edges of the plates 10 and the seal may thus be secured by a spacing layer of compressible material, or by the use of a bar so positioned as to leave the desired spacing.

Having thus described my invention what I claim as new and desire to secure by Letters Patent is:—

1. The process of making composite metal sheets or plates having corrosion resistant facings, which includes forming a stack in which a pair of corrosion resistant metal plates intended to form the facings of the sheets are sandwiched between a pair of iron or steel slabs and each spaced from the adjacent slab by a thin layer of iron, welding bars around the edges of the slabs to hold said slabs together, said bars being spaced from the edges of the corrosion resistant plates to permit said corrosion resistant plates to expand linearly with respect to said slabs, heating the stack, and rolling said stack down to the desired thickness.

2. The process of making metal composite sheets or plates having corrosion resistant facings, which includes forming a pile in which a pair of corrosion resistant metal plates are sandwiched between two metal slabs, placing a layer of comparatively pure iron between each slab and the adjacent corrosion resistant plate, welding the two slabs together along the edges thereof, said plates being smaller than the slabs so that the edges of said plates are spaced inwardly from the corresponding edges of said slabs, welding together the edges of the slabs along lines spaced from the edges of the plates, whereby said plates are free to expand with respect to said slabs, heating the pile, rolling said pile down to the desired thickness, and cutting off the welded edges.

3. The process of making composite metal sheets or plates having corrosion resistant facings, which includes forming a pile including a pair of corrosion resistant metal plates disposed between two metal slabs intended to form the base layers for said corrosion resistant facings, each of said plates being spaced from its adjacent slab by a thin iron plate, welding bars around the edges of said slabs to enclose the corrosion resistant plates and to hold said slabs in predetermined relative positions, said bars being spaced from the edges of said corrosion resistant plates to permit linear expansion of said plates with respect to the slabs, heating the pile, permitting the air between the edges of said plates and said bars to escape while substantially preventing foreign gases from outside the pile from entering between the slabs, rolling said pile to the desired thickness, and cutting off the welded edges.

4. The process of forming metal composite sheets or plates, each having a corrosion resistant facing, which includes forming a pile in which a pair of corrosion resistant metal plates are disposed between two metal slabs, said plates being smaller than the slabs so that the edges of said plates are spaced inwardly from the corresponding edges of said slabs, applying a layer of compressible fireproof material along the edges of said corrosion resistant plates, welding together the edges of the slabs, whereby said plates may expand with respect to said slabs, and subjecting the pile to heat and pressure to weld each plate to the adjacent slab, and to reduce the thickness.

5. The process of making metal composite sheets or plates having corrosion resistant facings, which includes forming a pile in which a pair of corrosion resistant metal plates are sandwiched between two metal slabs, placing a layer of comparatively pure iron between each slab and the adjacent corrosion resistant plate, welding the two slabs together along the edges thereof, said plates being smaller than the slabs so that the edges of said plates are spaced inwardly from the corresponding edges of said slabs, welding together the edges of the slabs, heating the pile, rolling said pile down to the desired thickness, and cutting off the welded edges.

Signed at New York in the county of New York and State of New York this 29th day of March A. D. 1932.

WALLACE C. JOHNSON.